SENSING DEVICE OF ACCELERATION AND VIBRATION

BRIEF SUMMARY OF THE INVENTION

The invention is directed to a device for sensing acceleration and vibration, more particularly to a device for sensing and detecting with certainly acceleration and vibration due to earthquake, landslide or stone fall, failure in the construction work or due to passage of heavy vehicles or machine operation. The device fairly serves to prevent the danger consequent on such emergencies.

In prior art vibration sensing and detecting machines, vibrators have been utilized which are generally of the pendulum or ball type. One kind of the vibrators, such as the seismometer, includes a mechanical sensor means using a pendulum or electrical one of the piezoelectric or movable coil system. These known vibration sensing and detecting devices have each particular performance to serve for the same object of sensing vibration.

While such devices as described above are featured as has been already known to people, the device of the present invention is characterized by the novel principle and mechanism from which it is constructed.

The device according to the present invention provides for sensing vibration and includes a holding member which securely holds upwardly a sensor means by attracting force of magnet which may be deteached to drop at a predetermined intensity of vibration. Force, acceleration, or vibration of an object in the above-mentioned circumstance can thus be fairly detected. In the device, an operating mechanism associated with the sensing device is effectively operated.

An object of the present invention is the provision of a device which can sense and detect the force, acceleration, or vibration by aid of the type and construction which are novel and simple in application.

Another object of the invention is the provision of a device which, in addition to the function as set forth in the preceding object, simultaneously sense and measure the magnitude of force, acceleration, or vibration.

It is also an object of this invention to provide a means which is particularly adapted for sensing and detecting acceleration and vibration of an earthquake.

Another object of this invention is to provide a means which can fairly sense and measure the magnitude of force, acceleration or vibration of an earthquake.

It is also an object of the present invention which can sense and detect an earthquake and like vibration by an operating means actuated to directly open or close valves, cocks, or switches for avoiding a danger.

A still another object of the present invention is to provide a device which can sense and detect the vibration or inclination of the ground such as caused from landslide or similar accidents.

Other objects and advantages of the present invention should be readily apparent by reference to the following specification considered in conjunction with the accompanying drawings. It is to be understood that any modifications may be made in the structural details there shown and described without departing from the scope and spirit of the invention.

The invention provides a device which essentially includes a holding member provided in the upper part of a casing and a sensor weight of a cylindrical shape attracted to and depending from the holding member by magnetic force, wherein upon acceleration or vibration from outside, or in most cases vibration of an earthquake being applied to the sensing device, the sensor weight senses and detects the force, acceleration, or vibration and is detached from the holding member and drops, whereby an operating means connected with the sensing device in the casing closes for example a valve in a piping through which gas, oil or like combustible fluid flow or opens the valve storing a fire extinguishing liquid. Otherwise, the operating means switches on or off electrical or air-operated means so as to prevent the danger of explosion or fire after occurrence of an earthquake. The sensing device may be previously arranged to operate in response to the inclination, acceleration or vibration of a predetermined stress to thereby sense and detect the gradient of inclination and the stress of vibration to issue an alarm.

DETAILED DESCRIPTION OF THE INVENTION

Figure 1:
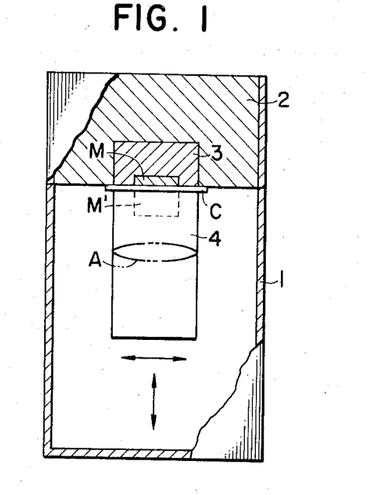
FIG. 1 is a diagrammatic view illustrating the essential principle of the invention.
Figure 2:
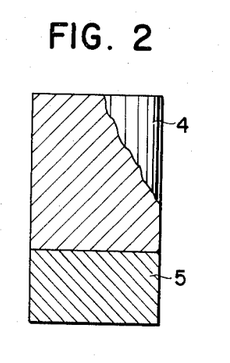
FIGS. 2, 3 and 4 are diagrammatic views of an embodiment of a sensor weight.
Figure 3:
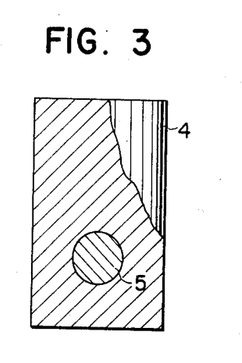
Figure 4:
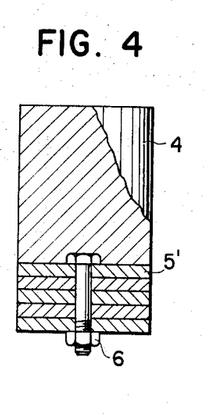
Figure 5:
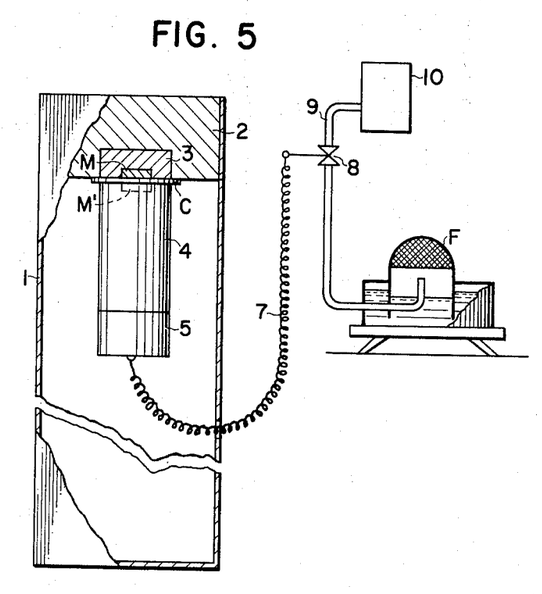
FIG. 5 is a view of the device of the invention, which is connected to a fire extinguishing device of a burner.

In FIG. 1 is illustrated the essential principle of the present invention. The casing 1 of the sensing device is provided with a cover 2 in the upper part thereof. The cover 2 has at the lower part a holding member 3 which carries in support a sensor means 4 of the cylindrical shape A.

The above described holding member 3 and sensor means 4 are formed of a magnetic material. Either one or both of the holding member and sensor means may be provided with permanent magnets M and M' or othmay be provided with the weight 5 so as to increase the dropping energy of the sensor means 4.

Figure 7A:
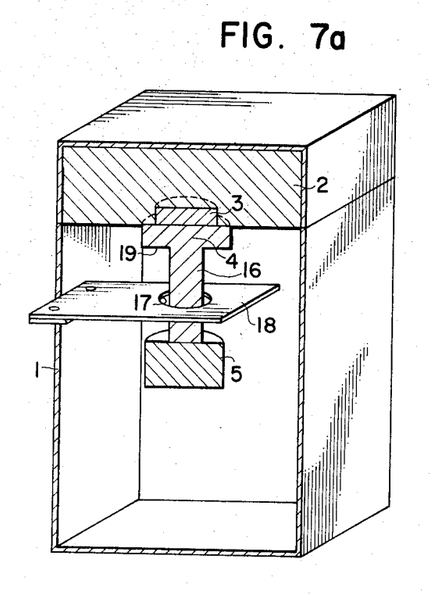
FIGS. 7a and 7b are diagrammatic views of the device of the invention including a plate operated by the sensor weight of the invention.
Figure 7B:
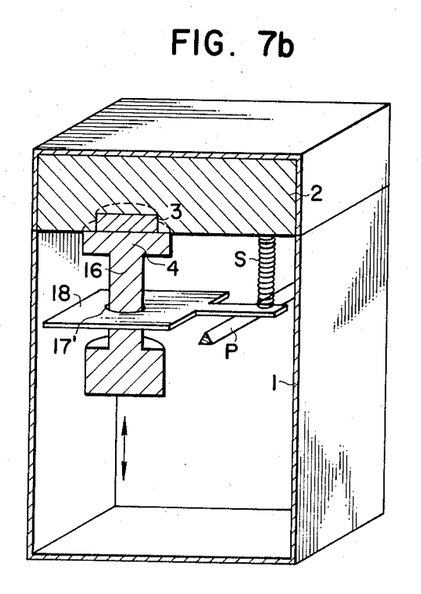

As shown in the embodiment of FIG. 7b, preferably space between a hole 17' of the operating plate 18 and the small diameter portion 16 of the sensor means 4 may be so small as to be able to sense the vertical vibration of an earthquake as shown by arrows. In FIG. 7b, a support spring S is secured to a cover 2 of the sensor casing to carry the operating plate 18 by a support member P fixed at the wall of the sensor casing.

Figure 8:
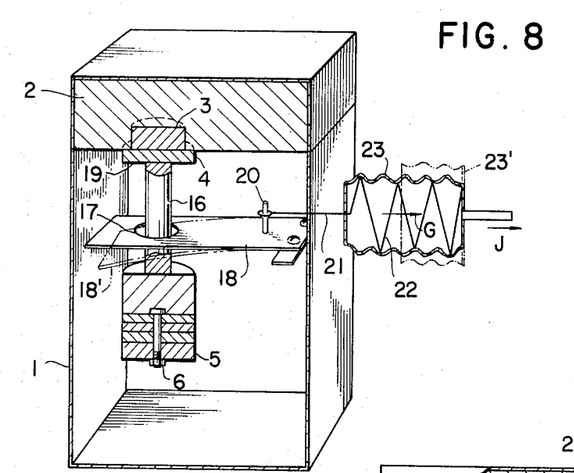
FIG. 8 is an embodiment of the device as shown in FIG. 7, which is connected to a discharging to a discharging means for a fire extinguishing liquid.

Preferably, the operation of the device as shown in FIG. 7a and 7b may be applied to FIG. 8, in which a pin 20 is provided at an end of the operating plate 18 with a connecting wire 21 engaged to the pin 20 leading to the outside of the sensor casing 1 and connected to a spring means 22 housed in the extensible container having water contained therein.

When the sensor means 4 drops and its stepped portion 19 contacts the operating plate 18 which has been moved downwards, the operating plate moves downwardly as shown by dotted lines 18'. By means of the pin 20, the connecting wire 21 is disengaged from the operating plate 18 and the spring means 22 is urged in the direction of the arrow G so that the extensible container 23 is moved in the direction of the arrow as shown by dotted line 23'. As the result, the liquid in the extensible container 23 jets out forcefully as shown by the arrow J. The described device may be disposed near a burner or combustible material, whereby fire can be extinguished directly when an earthquake occurs. If desired, a valve may be provided so as to be able to open or close by force of the spring means 22.

Figure 6:
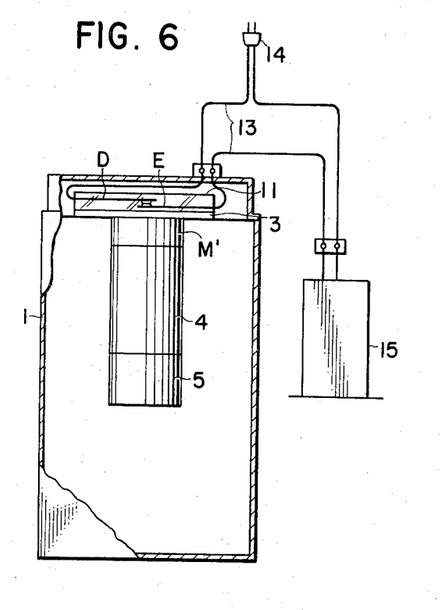
FIG. 6 is a view of of an embodiment of the device of the invention, which is used as a stopping means for an electrical machine.
Figure 9:
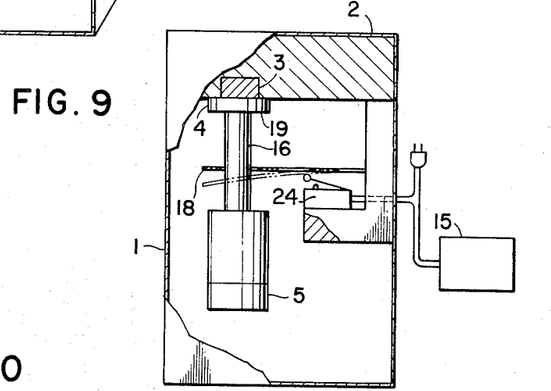
FIG. 9 is an embodiment of the device of the invention, in which the device of FIG. 7 is applied to electrical switching means.

The embodiment of FIG. 9 shows an example in which a switch is operated by movement of the operating plate 18. In this instance, the operating plate 18 contacts a microswitch 24 provided in the lower position and by this operation interrupts the supply of a current to the electrical means 15 outside the sensor casing 1. If desired, the microswitch being provided at upper position of the operating plate. This type of the sensor means as well as that of FIG. 6 is particularly employed for sensing the vibration caused from landslide or like accident and can issue an emergency signal of buzaar or electrical sign. Using the air microswitch in the same device in place of microswitch, it is possible to open or close air circuit. A substantial effect may be obtained by using the device in an emergency stop valve provided is a large plant.

Figure 10:
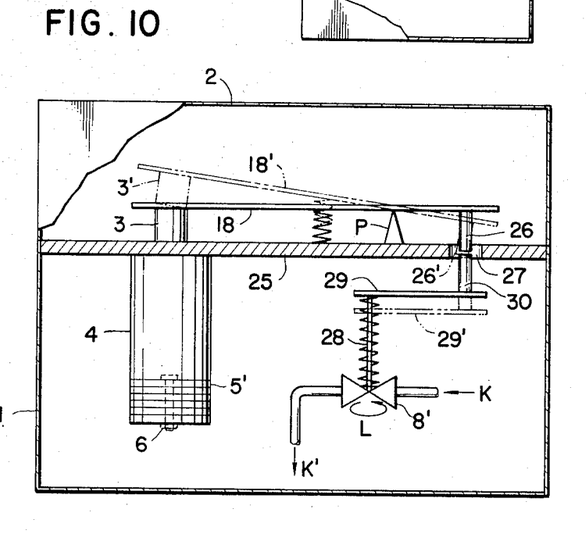
FIG. 10 is an embodiment of the device of the invention, in which an operating plate is provided in the upper part of the sensor weight.

An embodiment shown in FIG. 10 shows that the operating plate 18 as hereinbefore described is provided in the upper part of the sensor means 4. There is also provided an operating plate 18 in the holding member 3 with the sensor means 4 depending therefrom. This operating plate is connected through support member P to a holding plate 25 provided in the sensor casing 1. A projection 26 is provided at the end of the operating plate 18 and with the projection 26 fitted into the aperture 27 of the holding plate 25.

A push rod 28 is fixed at a bar 29 and it has a spring to urge a cock 8' to turn which is provided in the way of a piping for supplying gas for example to a burner. Other end of the bar 29 is provided with a receiver 30 which is fitted into the aperture 27 of the holding plate 25 from below.

When the sensor means 4 senses vibration and drops, a holding member 3 and the operating plate 18 integrated with it are released from magnetic force and bounces upwardly as shown by dotted lines 3' and 18'. The projection 26 at the end of the operating plate 18 moves downwardly at 26' and pushes the receiver 30. The bar 29 is thereby moved downwards as shown by dotted lines 29'. By this operation, the push rod 28 is pushed downwardly to turn the cock 8' and close the gas piping. Arrows K and K' show the direction of a passing gas and arrow L the direction of turning of the cock 8'. The cock 8' is always circulated with liquid. If desired, a cock of the type closing 90° by half rotation may be used.

Figure 11A:
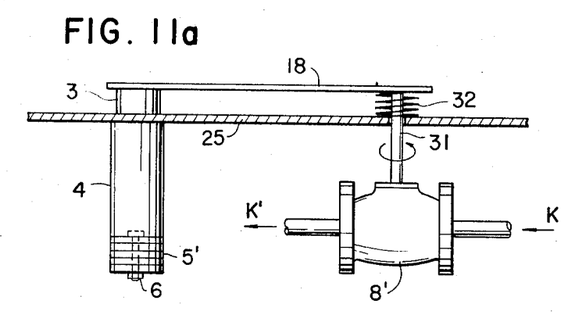
FIGS. 11a and 11b show an embodiment of the device of the invention, in which the device of FIG. 10 is used for opening an closing a cock.
Figure 11B:
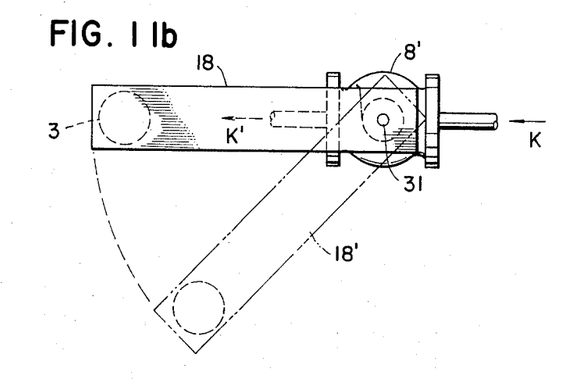

FIG. 11a illustrates a construction of the device in which an end of the operating plate 18 is directly connected to a drive shaft 31 of the cock 8'. Upon dropping of the sensor means 4 the operating plate 18 is moved in rotation to a position 18' in FIG. 11b by force of a coil spring 32 and moves a drive shaft 31 to close the cock 8'.

Figure 12:
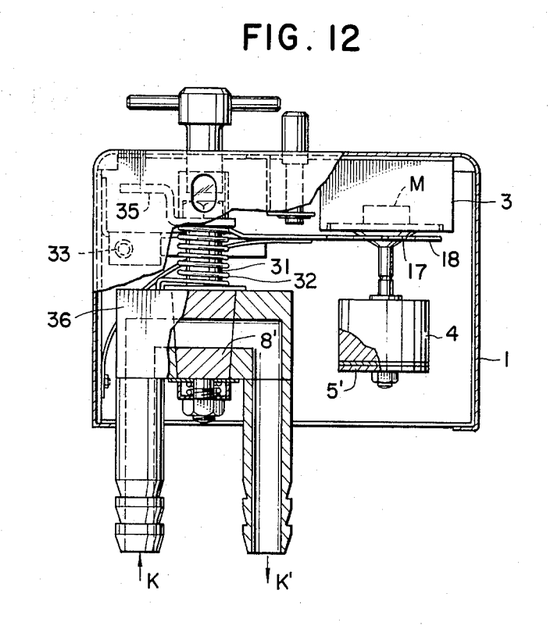
FIG. 12 is an embodiment of the device of FIG. 7, which is used for closing a cock, showing the interior of the device partly in cross section.
Figures 13, 14:
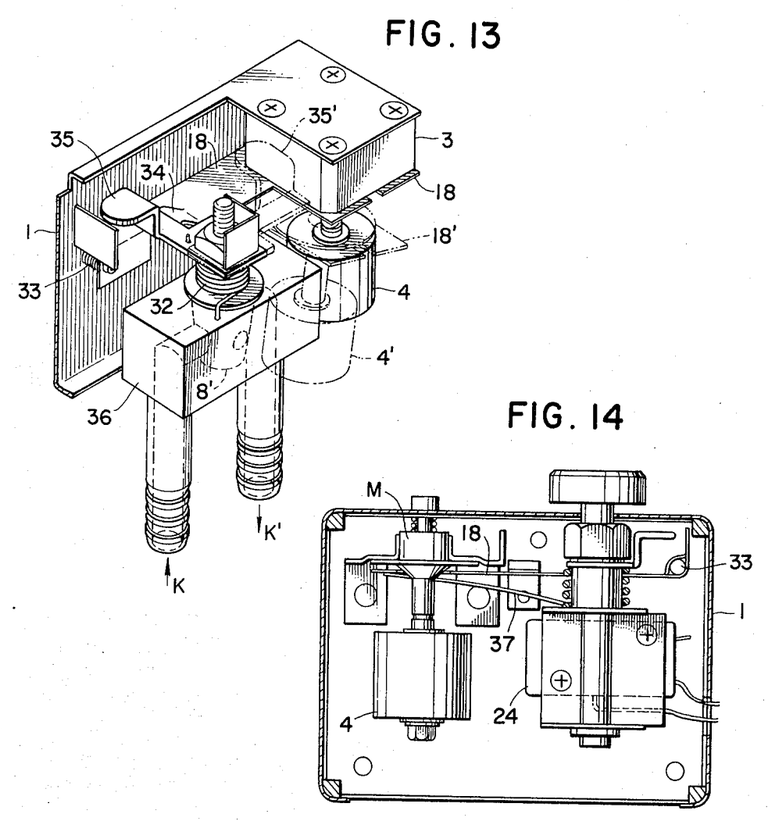
FIG. 13 is a perspective view of the device of the invention illustrating the operation of FIG. 12.
FIG. 14 is an embodiment in elevational view showing the interior of the embodiment of FIG. 9.

An embodiment of FIGS. 12 and 13 provides a device which can move in striking the operating plate by dropping of the sensor means as shown in FIG. 7 and application of the device to the closing of a gas pipe. According to the embodiment, the sensor means 4 is suspended by magnetic force from the holding member 3 in the sensor casing 1. The loose hole 17 in the operating plate 18 can loosely receive the sensor means 4. An end of the operating plate 18 is revolvably engaged with the sensor casing 1 with bolt 33. Also, in the middle of the operating plate 18 is provided a stopper 34.

A cock 8' is provided in the path connected to the gas pipe (FIG. 12 shows the path opened to flow the gas therethrough). A drive shaft 31 secured to the upper portion of the cock 8' has a pivot member 35 thereon. The described pivot member 35 is always pressed by the stopper 34 and located in a position as shown in FIG. 13. The drive shaft 31 as described is wound with a coil spring 32, which is secured to the upper part of an outer shell 36 of a gas pipe between a pivot member 35.

Referring to FIG. 13, operation of the device is now illustrated. As has been described, when the sensor means 4 drops to a position 4' by vibration, the operating plate 18 is pushed downwardly to the position 18'. With the operating plate 18 moved downwards, the stopper 34 on the operating plate is moved downwards so that the stopper is released from engagement with the pivot member 35 which is secured to the drive shaft 31 of the cock 8'. The pivot member 35 is urged to a position 35' a shown by dotted lines by force of the coil spring 32. At the same time, the cock 8' fixed at the drive shaft 31 is moved so that the connection passage K and K' is closed. As shown, the cock 8' may preferably be of the type adapted to close the passage by rotation at an angle of 90°.

Figure 15:
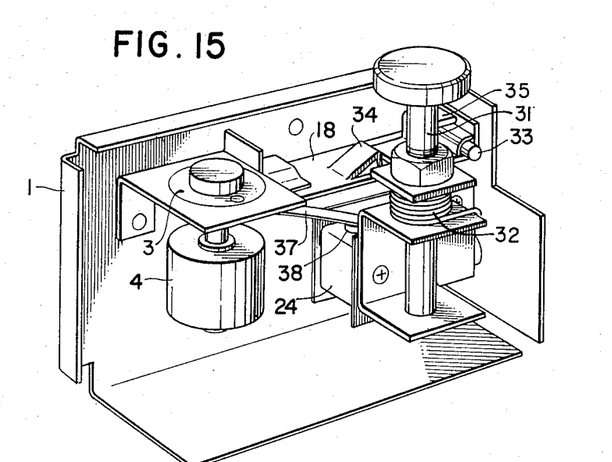
FIG. 15 is a perspective view illustrating the interior of the device of FIG. 14.

FIGS. 14 and 15 show an embodiment of a switch mechanism as illustrated in FIG. 9. The embodiment provides for that when the sensor means 4 drops by vibration, the operating plate 18 is depressed downwardly. The operation pushes a operating bar 37 attached to the microswitch 24 forwardly. The operating bar 37 pushes the actuator 38 to operate the microswitch 24.

The device of the present invention thus utilizes the physical principle that a force attracting and detaching a cylindrical body to and from a magnet is always constant. In the manner as described, the device can sense the external acceleration and vibration by dropping of the sensor weight so that a particular effect is obtained in the time of earthquake and most reliable sensing and detection are performed. The device can be operated in association with valves, cocks, and switches in burners, gas pipings, and electrical appliances. By the device, these are safely guarded from explosion, fire and other accidents after earthquake occurred. In other case, the device can be used for sensing inclination of the ground in a place where landslide, collapsed of buildings and machined may occur.

What is claimed is:

1. A sensing device for sensing the acceleration of vibration of an earthquake or the like, which comprises a casing vertically disposed on the ground or like material, said casing having a cover provided with a holding member, said holding member having a permanent magnet suspended therefrom or consisting per se of a magnetic material, a cylindrical sensor means formed of a magnetic material having an upper surface attracted by magnetic force to the magnetic lower surface of the holding member, said sensor means in said attracted position being located in said casing to provide a space below and around the sensor means so as to permit the sensor means to fall upon sensing a horizontal movement of an earthquake or like vibration and whereby the sensor means falls when the acceleration of vibration reaches a predetermined level of intensity.

2. A sensing device as claimed in claim 1 wherein an adjusting weight is provided in a lower part of the sensor means so as to vary the weight and the center of gravity of the sensor means.

3. A sensing device as claimed in claim 1 wherein said holding member is made of a magnetic material and a permanent magnet is fitted onto an upper surface of the sensor means.

4. A sensing device as claimed in claim 1 wherein the sensor means is all magnetized.

5. A sensing device as claimed in claim 3 wherein an adjusting plate of non-magnetic material is provided between the holding member and sensor means to control the attractive force of the magnet.

6. A sensing device as claimed in claim 1 including an emergency fire extinguishing means comprising a wire provided in a lower part of the sensor means, an end of the wire extending to the outside of the casing, a container of water, fire-estinguishing liquid or gas provided above a burner, a piping leading from the container to the burner with a cock in the way of said piping, said cock being connected with an end of said wire, whereby the wire is pulled by falling energy of the sensor means and the cock is opened.

7. A sensing device as claimed in claim 1 including an emergency electrical interrupting means, comprising a holding member in the upper part of the casing, a reed switch provided in the upper part of the holding member, said reed switch having contact member normally contacting each other, a leading wire connected from the reed switch to a power source and electrical means, the dropping of said sensor means disconnecting said contact member and interrupting flow of current to the electrical means.

8. A sensing device as claimed in claim 1 which further includes an emergency cock or valve closure means comprising a casing having a holding plate fixed in the upper part of a peripheral walls in the casing, a holding member provided in the upper part of the holding plate, said holding member having a sensor means with said holding plate held in suspension therebetween, said holding member having an end of an operating plate horizontally fixed thereto, said operating plate being connected to said holding plate by a support member, said holding plate having an aperture provided therein, said operating plate having a projection downwardly at a lower surface of an end of the operating plate to fit into said aperture, means having a piping and a cock in the way thereof in the lower part of said holding plate, said cock being provided vertically with a push rod with an end of a bar horizontally provided at the upper end of the push rod, a receiver being provided upwardly on the upper surface of other end of said bar, the receiver entering into an aperture of the holding plate and directed to a projection of said holding plate, wherein when the sensor means suspended on the holding member falls from vibration, the operating plate pivotally move upwardly on the support and then the projection moves downwardly depressing the received, and at the same time the bar moves downwardly, the push rod connected to the bar being pushed thereby operating a cock in the piping.

9. A sensing device as claimed in claim 1 which includes an emergency cock or valve closure means comprising a casing having a holding plate fixed in the upper part of peripheral walls in the casing, a holding member arranged in the upper part of the holding plate, the sensor means suspended on said holding plate being held therebetween, said holding member being fixed horizontally with an end of an operating plate, means having a piping and a cock in the way thereof in the lower part of said holding plate, said cock having a drive shaft vertically disposed for operating said cock, the drive shaft passing through an aperture opened in said holding plate and extending across the holding plate and fixed at the other end of said operating plate, a spring coiled on said drive shaft with an end fixed at the operating plate and other end fixed at the holding plate, wherein when the sensor means falls from vibration the holding member moves transversely horizontally by a force of the spring and at the same time the drive shaft moves around operating the cock in the piping.

10. A sensing device as claimed in claim 1 comprising a sensor means having a cylindrical body provided with a small diameter portion in the middle thereof, an operating plate having an end fixed to the peripheral walls in the casing and transversely disposed having other end free of movement, said operating plate having a loose hole which is considerably larger than a small diameter part of said sensor means and smaller than a large diameter part of the sensor means, wherein the sensor means falls when it receives acceleration of vibration above a fixed level of intensity in a horizontal direction as well as in a vertical direction and then a stepped portion formed between the large diameter part and small diameter part strikes at the operating plate to vibrate the operating plate.

11. A sensing device as claimed in claim 10 wherein the operating plate has an end movably attached to the peripheral walls in the casing and other end free of movement, having a stopper provided in the middle upper surface of the operating plate, means having a cock in a piping below in the casing, said cock being connected to a drive shaft on which a pivotal member is mounted, a spring wound on the drive shaft, one end of said spring being connected to said pivotal member and other end of the spring is fixed at an outer shell enclosing the piping, said pivotal member is pressed by the stopper of said operating plate and is prevented from movement in a direction by said stopper, wherein when the sensor means falls and depresses the operating plate the stopper is released from the pivotal member which pivotally moves by force of the spring and at the same time the drive shaft is rotated to operate the cock in the piping.

12. A sensing device as claimed in claim 11, wherein the operating plate has an end movably attached to the peripheral walls in the casing and other end free of movement, including a microswitch in the lower part of the casing, having an end of the operating bar to push an actuator for the microswitch provided on a box for the microswitch and other end disposed below said operating plate, and wherein when the sensor means falls from vibration to push down the operating plate the operating bar is depressed to make the operating bar push the actuator of the microswitch and actuate the microswitch.

* * * * *

United States Patent
Cuomo

[11] 3,831,137
[45] Aug. 20, 1974

[54] ACOUSTO-OPTIC UNDERWATER DETECTOR

[75] Inventor: Frank W. Cuomo, East Providence, R.I.

[73] Assignee: The United States of America as represented by the Secretary of the Navy, Washington, D.C.

[22] Filed: Apr. 14, 1972

[21] Appl. No.: 246,092

[52] U.S. Cl............. 340/8 R, 73/71.1, 250/227, 340/13, 350/96 B
[51] Int. Cl................................. G01v 1/16
[58] Field of Search.......... 350/96, 193; 181/.5 NP, 181/.5 H; 356/4, 106; 73/67.2, 67.5, 71.1, 71.3; 340/8, 12, 13; 250/227

[56] References Cited
UNITED STATES PATENTS

| | | | |
|---|---|---|---|
| 3,533,056 | 10/1970 | Clark | 340/8 X |
| 3,541,848 | 11/1970 | Thurstone | 73/67.5 |
| 3,580,082 | 5/1971 | Strack | 73/71.3 |
| 3,584,227 | 6/1971 | Matsas | 350/96 B |
| 3,642,090 | 2/1972 | Bennett | 181/.5 H |

*Primary Examiner*—Benjamin A. Borchelt
*Assistant Examiner*—H. J. Tudor
*Attorney, Agent, or Firm*—Richard S. Sciascia; Arthur A. McGill; Prithvi C. Lall

[57] ABSTRACT

A low frequency or pressure-gradient hydrophone comprising an optical reflector experiencing displacements responsive to acoustic waves. A beam light from a light source is carried by a first group of fiber optics guides and is incident upon the optical reflector. The light reflected from the reflector is carried by a second group of fiber optics guides to a light detector. Any displacements of the reflector due to pressure gradient due to acoustic waves impinging on the opposite sides of the reflector are detected by changes in intensity of reflected light from the light source.

4 Claims, 4 Drawing Figures